(12) United States Patent
Sweazey et al.

(10) Patent No.: US 11,772,447 B2
(45) Date of Patent: Oct. 3, 2023

(54) UNIVERSAL MOUNTING PLATE FOR AN AUXILIARY AIR CONDITIONING SYSTEM

(71) Applicant: Phillips & Temro Industries, Inc., Eden Prairie, MN (US)

(72) Inventors: John David Sweazey, Eden Prairie, MN (US); Jeffrey James Martell, Bloomington, MN (US); Eric Graham Ruggles, Bloomington, MN (US); Donald Joseph Manderfeld, Eden Prairie, MN (US)

(73) Assignee: PHILLIPS & TEMRO INDUSTRIES, INC., Eden Prairie, MN (US)

( * ) Notice: Subject to any disclaimer, the term of this patent is extended or adjusted under 35 U.S.C. 154(b) by 138 days.

(21) Appl. No.: 17/226,740

(22) Filed: Apr. 9, 2021

(65) Prior Publication Data

US 2021/0221193 A1    Jul. 22, 2021

Related U.S. Application Data

(62) Division of application No. 16/257,989, filed on Jan. 25, 2019, now Pat. No. 10,974,565.

(60) Provisional application No. 62/623,177, filed on Jan. 29, 2018.

(51) Int. Cl.
*B60H 1/00* (2006.01)
*F24F 13/30* (2006.01)
*F24F 13/20* (2006.01)

(52) U.S. Cl.
CPC ..... *B60H 1/00021* (2013.01); *B60H 1/00028* (2013.01); *B60H 1/00542* (2013.01); *F24F 13/30* (2013.01); *B60H 2001/00078* (2013.01); *F24F 2013/202* (2013.01)

(58) Field of Classification Search
CPC ............ B60H 1/00542; B60H 1/00535; B60H 1/00528; B60H 1/00028; B60H 1/00021; B60H 2001/00078; F24F 13/30; F24F 2013/202

See application file for complete search history.

(56) References Cited

U.S. PATENT DOCUMENTS

| | | |
|---|---|---|
| 1,898,835 A | 2/1933 | Henderson |
| 3,866,867 A | 2/1975 | Larocca |
| 5,098,046 A | 3/1992 | Webb |

(Continued)

FOREIGN PATENT DOCUMENTS

CN            104344532        2/2015

*Primary Examiner* — Cassey D Bauer
(74) *Attorney, Agent, or Firm* — FOLEY & LARDNER LLP

(57) ABSTRACT

A mounting structure for a compressor assembly of an auxiliary air conditioning system for a vehicle includes a mounting plate that includes a first surface, a second surface, a first plurality of apertures, and a second plurality of apertures. The mounting structure also includes a plurality of mounts disposed at the first surface, the plurality of mounts including a mount attached to the mounting plate via fasteners extending through the first plurality of apertures. The mounting structure also includes a mounting panel of a compressor unit of the auxiliary air conditioning system. The mounting panel includes a main portion having mounting apertures overlapping the plurality of mounts. Fasteners are disposed at the mounting apertures to attach the mounting panel to the mounting plate via the plurality of mounts.

17 Claims, 4 Drawing Sheets

(56) References Cited

U.S. PATENT DOCUMENTS

| | | |
|---|---|---|
| 6,260,373 B1 | 7/2001 | Rockwood |
| 6,267,435 B1 * | 7/2001 | Benz .................... B62D 27/06 |
| | | 296/192 |
| 7,398,949 B2 | 7/2008 | Weech et al. |
| 7,455,278 B2 | 11/2008 | Hsu |
| 8,403,289 B1 | 3/2013 | Rinderer |
| 8,985,539 B2 | 3/2015 | Riedel et al. |
| 10,668,582 B1 | 6/2020 | Rogers |
| 2006/0059932 A1 * | 3/2006 | Czechowicz ...... B60H 1/00542 |
| | | 62/298 |
| 2013/0043000 A1 | 2/2013 | Wang |
| 2017/0203632 A1 * | 7/2017 | Westendarp ....... B60H 1/00985 |

* cited by examiner

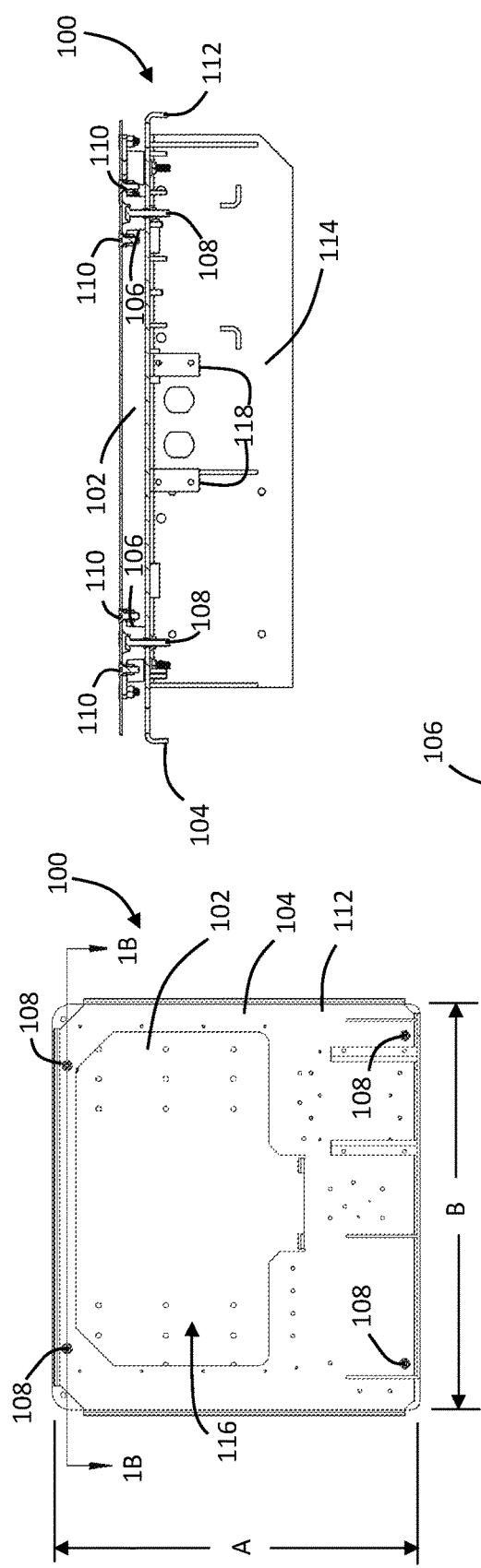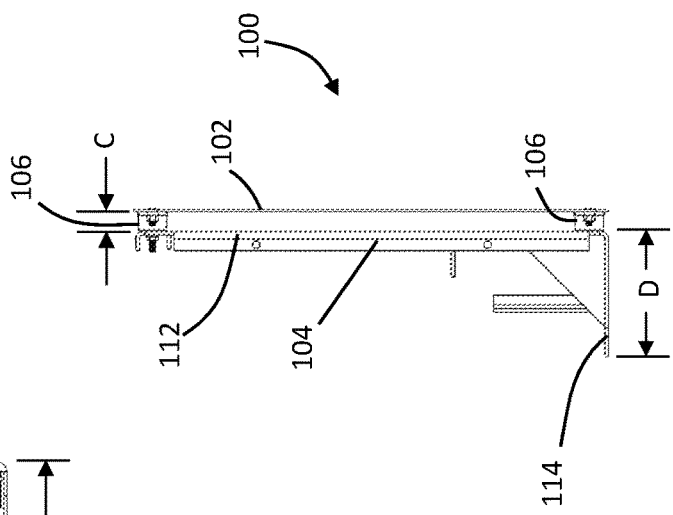

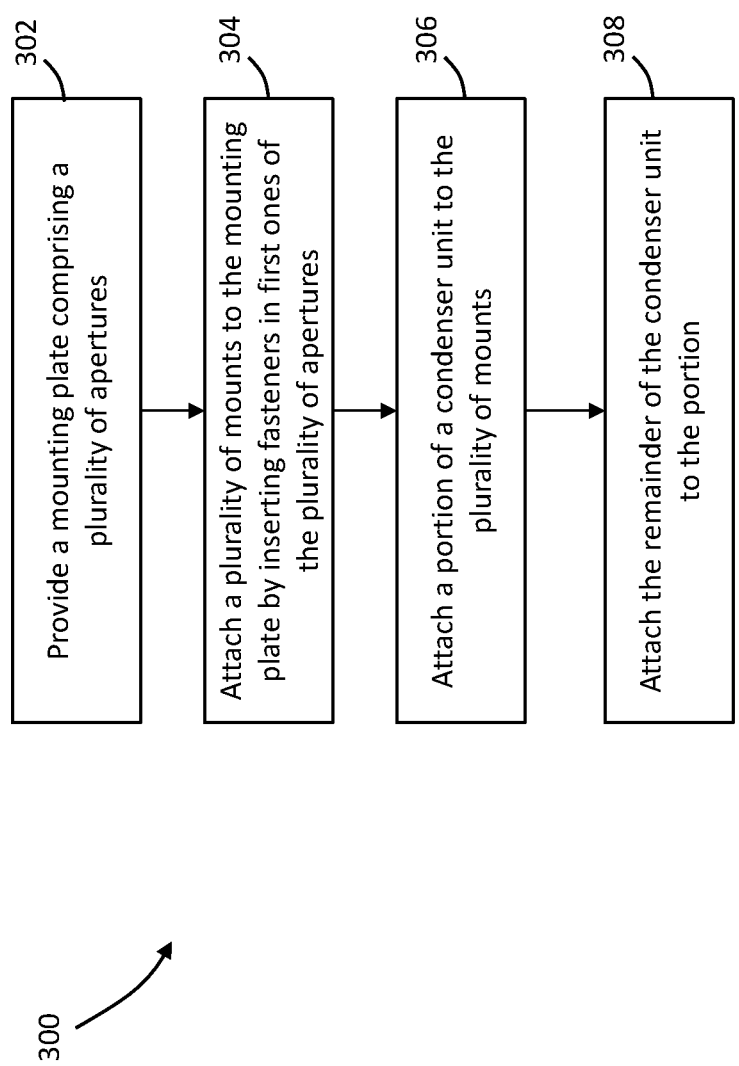

UNIVERSAL MOUNTING PLATE FOR AN AUXILIARY AIR CONDITIONING SYSTEM

CROSS-REFERENCE TO RELATED PATENT APPLICATIONS

The present application is a division of U.S. patent application Ser. No. 16/257,989, filed Jan. 25, 2019, which claims the benefit of and priority to U.S. Provisional Patent Application No. 62/623,177, filed Jan. 29, 2018, both of which are incorporated herein by reference in their entireties.

BACKGROUND

Over-the-road vehicles such as trucks may include an auxiliary air conditioning system used to regulate an interior temperature of a cab. For example, the auxiliary air conditioning system may draw power from an auxiliary battery and be used to cool the cab when the vehicle's engine is not running. Such auxiliary air conditioning systems may include heavy components rendering their installation difficult and burdensome.

SUMMARY

One embodiment of the invention relates to a mounting structure for a compressor assembly of an auxiliary air conditioning system for a vehicle. The mounting structure includes a mounting plate that includes a first surface, a second surface, a first plurality of apertures, and a second plurality of apertures. The mounting structure also includes a plurality of mounts disposed at the first surface, the plurality of mounts including a mount attached to the mounting plate via fasteners extending through the first plurality of apertures. The mounting structure also includes a mounting panel of a compressor unit of the auxiliary air conditioning system. The mounting panel includes a main portion having mounting apertures overlapping the plurality of mounts. Fasteners are disposed at the mounting apertures to attach the mounting panel to the mounting plate via the plurality of mounts.

Another embodiment is directed to a vehicle. The vehicle includes a cab including a rear surface and a mounting plate disposed on the rear surface. The mounting plate includes a plurality of apertures and is attached to the rear surface via fasteners extending through a first portion the plurality of apertures. The vehicle also includes an auxiliary air conditioning system including an evaporator disposed interior to the cab and a condenser unit including a mounting panel attached to the rear surface via the mounting plate.

Another embodiment relates to a method of installing a condenser unit onto a surface of a vehicle. The method includes providing a mounting plate comprising a first plurality of apertures and a second plurality of apertures. The method also includes attaching a plurality of mounts to the mounting plate via inserting fasteners through first openings in the mounts and through the first plurality of apertures. The method also includes attaching a portion of the condenser unit to the plurality of mounts via inserting fasteners into second openings in the mounts and through mounting apertures of the portion. The method also includes attaching the mounting plate to an exterior surface of the vehicle by inserting fasteners through the second pluralities of apertures and into openings in the exterior surface.

BRIEF DESCRIPTION OF THE DRAWINGS

FIGS. 1A, 1B, and 1C are views of a mounting structure for a condenser unit of an auxiliary air conditioning system, according to various example embodiments.

FIG. 3 is a flow diagram of a method of installing a condenser unit onto a vehicle surface, according to an example embodiment.

DETAILED DESCRIPTION

Figure 2A:
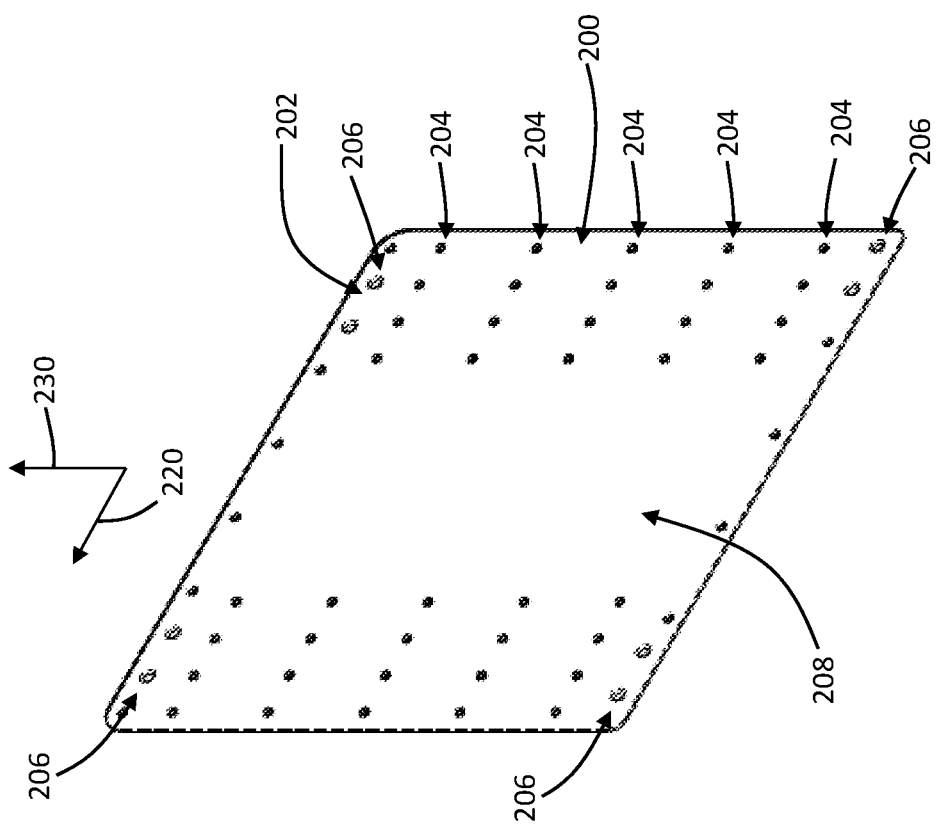
FIG. 2A is a perspective view of a mounting plate, according to an example embodiment.

Referring generally to the figures, described herein is a universal mounting plate for a component of an auxiliary air conditioning system for a vehicle. An auxiliary air conditioning system may include, among conditional components, a condenser, a compressor, and an evaporator unit. For example, in one embodiment, the condenser and the compressor are in a single unit installed on a structural frame of the vehicle. This unit is heavy, which may create difficulties in mounting the unit to the vehicle. For example, existing mounting methods may require mounting the unit directly to an outer surface of the vehicle. To correctly position the unit, an installer may have to lift the unit or use a template to find suitable locations for drilling holes in the vehicle's frame. Alternatively, isolation mounts may be installed in a suitable arrangement prior to attaching the unit to the vehicle. Any of these methods are time consuming and burdensome for the installer. For example, if the surface to which the unit is mounted is uneven (e.g., due to damage, manufacturing defects, or non-uniformities), installation may have to be restarted at a new location.

Described herein are methods and apparatuses that alleviate such deficiencies associated with traditional mounting techniques. In various embodiments, a condenser unit associated with an auxiliary air condition system of a vehicle is mounted to an outer surface of a vehicle via a universal mounting plate. The outer surface may include a rear surface of the vehicle's cab (e.g., in embodiments where the vehicle is an over-the-road vehicle such as a truck). In various embodiments, the universal mounting plate includes a first plurality of apertures and a second plurality of apertures. The first plurality apertures may include sets of apertures adapted to have mounts attached thereto. The mounts may be for connecting a portion of the compressor unit to the mounting plate. Accordingly, the first plurality of apertures may be arranged such that the mounts are positioned to align with mounting portions of the compressor unit. As such, the arrangement of the first plurality of apertures ensures proper alignment of the mounts, thus eliminating the need for the installer to align the individual mounts.

In another aspect, the mounting plate is substantially planar, thus providing an even surface upon which to mount the portion of the condenser irrespective of the condition of the outer surface of the vehicle. Furthermore, the portion of the condenser may include an opening positioned to expose the second plurality of apertures, thus providing the installer with a number of options in terms of points of connection between the universal mounting plate and an outer surface of the vehicle. Thus, the installer may quickly and efficiently install the combination of the mounting plate, mounts, and the portion of the compressor unit onto the vehicle at a desired location. For example, the mounting plate may be attached to a rear surface of the vehicle's cab atop of the vehicle's frame. In this way, the condenser unit can be installed on vehicles with limited frame rail space.

Referring generally to FIGS. 1A, 1B, and 1C, various views of a mounting structure 100 for a condenser unit of an auxiliary air conditioning system for a vehicle are shown, according to various example embodiments. FIG. 1A shows a perspective view of the mounting structure 100. FIG. 1B shows a cross-sectional view of the mounting structure 100 at the line A-A shown in FIG. 1A. FIG. 1C shows a side view of the mounting structure 100. As shown, the mounting structure 100 includes a mounting plate 102, a mounting panel 104, and a plurality of mounts 106 disposed between the mounting plate 102 and the mounting panel 104. The structure of the mounting plate 102 is described in more detail with respect to FIGS. 2A and 2B.

In various embodiments, the mounting panel 104 is a portion of a condenser unit of the auxiliary air conditioning system. For example, various additional components, such as a housing having a condenser and compressor disposed therein, may be attached to the mounting panel to complete the installation of the condenser unit once the mounting structure 100 is attached to the vehicle. In at least one embodiment, such additional components may be bolted, screwed, or otherwise fastened to the mounting panel 104.

As shown in FIG. 1B, fasteners 110 extend through apertures (e.g., the second plurality of apertures 202 described with respect to FIG. 2A) within the mounting plate 102 and first openings in mounts 106. In some embodiments, the mounts 106 include a central portion with extensions (e.g., tabs) protruding therefrom. The central portion may include a surface that abuts against the mounting panel 104 to isolate the fasteners 110 from the mounting panel 104. In some embodiments, mounts 106 further include vibration dampeners disposed proximate to the mounting panel 104 to eliminate stresses placed on the mounting panel 104 resulting from vibrations propagating through the vehicle (e.g., from obstacles encountered on the road). The extensions of mounts 106 may include apertures through which fasteners 110 extend. In the example shown, mounts 106 include two extensions such that two fasteners 110 couple each of the mounts 106 to the mounting plate 102. Such a configuration prevents rotation of the mounts 106, thus ensuring a secure long-term connection between mounts 106 and the mounting plate 102.

In various embodiments, fasteners 110 are screws including heads disposed at a first (e.g. rear) surface of the mounting plate 102. Fasteners 110 may also include a body having threads extending through apertures in the mounting plate 102. Washers (e.g., a combination of flat and lock washers) may be used in conjunction with a bolt (e.g., a hex bolt) to affix fasteners 110 at a second (e.g., front) surface of the mounting plate 102.

Fasteners 108 extend through mounting apertures in the mounting panel 104 and second openings in the mounts 106 to attach the mounting panel 104 to the mounts 106. For example, second openings may extend through central portions of the mounts 106. As shown, the mounting panel 104 includes a plurality of sets of mounting apertures. In various embodiments, the sets of mounting apertures include evenly spaced rows of mounting apertures forming a rectangular outline. In the example shown, each of the sets of mounting apertures in the mounting panel 104 includes a row of four mounting apertures. Such an arrangement provides flexibility in terms of the relative positioning of the mounts 106 and the mounting panel 104. As shown, for example, fasteners 108 are disposed within next-to-outermost ones of the mounting apertures. Thus, the mounting panel 104 may be moved horizontally with respect to the mounting plate 102 while maintaining the same arrangement of the mounts 106. For example, the mounting panel 104 may be moved to the left such that fasteners extend through outermost mounting apertures on the right side of the mounting panel 104. Thus, if an obstacle obstructs the compressor unit from being mounted in an initially desired location, the mounting panel 104 may be moved to provide any necessary clearance.

In various embodiments, fasteners 108 are screws including heads disposed at a first (e.g. front) surface of the mounting panel 104. Fasteners 108 may further include a body having threads extending through apertures in the mounting panel 104 and the first openings of the mounts 106. Washers (e.g., a combination of flat and lock washers) disposed between the heads and the first surface of mounting panel 104 and the heads to securely attach the mounting panel 104 to mounts 106.

As shown in FIGS. 1B and 1C, the mounting panel 104 includes a main portion 112 and an attachment portion 114 extending from an end of the main portion 112. The attachment portion 114 extends at an angle (e.g., 90 degrees or approximately perpendicular) to the main portion 112. As shown, the attachment portion 114 includes apertures configured to receive fasteners for attaching additional components of the compressor unit (e.g., a frame) to the mounting panel 104.

As shown in FIG. 1A, main portion 112 includes an opening 116 extending therethrough. The opening is dimensioned such that the opening 116 overlaps with a set of apertures (e.g., the first set of apertures 200 described with respect to FIG. 2A) in the mounting plate 102. In other words, after the mounting panel 104 is attached to the mounting plate 102 via mounts 106, the apertures in the mounting plate 102 are exposed. This enables an installer to position the mounting structure 100 in a desired location to, for example, drill holes in a frame of the vehicle's cab to attach the mounting structure 100 to an external surface of the vehicle. Since a plurality of apertures in the mounting plate 102 are exposed via the opening 116, the mounting structure 100 provides a great amount of flexibility in terms of the locations for points of connection between mounting structure 100 and the vehicle.

Opening 116 includes a first portion and a second portion extending from a boundary (e.g., a lower edge) of the first portion. The second portion includes tabs 118 extending from a boundary thereof. Tabs 118 are configured to receive fasteners to enable attachment of various additional components of the compressor unit to mounting panel 104.

Mounts 106 are arranged in a manner such that the second openings therein align with the mounting apertures in the mounting panel 104. As such, the apertures in the mounting plate 102 (e.g., the first plurality of apertures described with respect to FIG. 2A) are arranged such that, when the mounts 106 are attached thereto, the mounts 106 are properly aligned with the mounting apertures. As such, the arrangement of the apertures in the mounting plate 102 eliminates the need for an installer to ensure that the mounts 106 are properly aligned with one another.

In the example shown, the mounting panel 104 is substantially rectangular-shaped, having a first dimension (e.g. a height) A and a second dimension (e.g., a width) B. In an embodiment, A is approximately 24.75 inches (e.g., with 0.03 inches of tolerance) and B is approximately 28.00 inches (e.g., with 0.03 inches of tolerance). In various embodiments, mounting plate 102 is also substantially rectangular-shaped, but includes dimensions that are less than those of the mounting panel 104. The mounting panel 104 may be positioned such that it covers outer edges of the mounting plate 102. For example, as shown in FIG. 1B, mounting plate 102 is centered with respect to the mounting panel 104 such that outer edges of the mounting panel 104 extend beyond outer edges of the mounting plate 102. The larger dimensions of the mounting panel 104 provide flexibility in terms of the number and positioning of mounting apertures that may be included therein. This facilitates the mounting flexibility described herein.

As shown in FIG. 1C, the mounts 106 have a thickness C that is approximately 1.12 inches (e.g., within 0.03 inches of tolerance). As such, a rear surface of the mounting panel 104 is separated from a front surface of the mounting plate 102 by a distance C. Additionally, the attachment portion has a width D that is approximately 6.50 inches (e.g., with 0.03 inches of tolerance). As such, the attachment portion 114 provides surface area to facilitate further attachment of additional compressor unit components to mounting panel 104.

In some embodiments, such as the one shown in FIG. 1C, mounts 106 are arranged such that an upper edge of the mounting plate 102 extends above an upper edge of mounting panel 104. However, the lower edge the mounting panel 104 extends far below that of the mounting plate 102. In such an arrangement, centers of the mounting plate 102 and mounting panel 104 are offset from another in a vertical direction. Such an offset facilitates the opening 116 only covering a portion of the mounting panel 104. This facilitates the opening 116 being large enough to overlap with a number of apertures in the mounting plate 102, but maintaining the structural strength of the mounting panel 104.

Referring now to FIG. 2A, a perspective view of the mounting plate 102 is shown, according to an example embodiment. As shown, the mounting plate 102 is substantially planar and rectangular-shaped. In various embodiments, the mounting plate 102 has a substantially uniform thickness of approximately 0.1 inches (e.g., 0.1046 inches within a predetermined manufacturing tolerance). However, this embodiment should not be regarded as limiting because alternative embodiments are envisioned. For example, in one embodiment, the mounting plate 102 is substantially-square shaped. Any suitable peripheral shape may be used for the mounting plate 102. Alternatively or additionally, the mounting plate 102 may include a curve or other contour.

In the example shown, the mounting plate 102 includes a first plurality of apertures 200 and a second plurality of apertures 202. The second plurality of apertures 202 includes four pairs of apertures 206. Each pair of apertures 206 includes two apertures aligned with one another in a first direction 220. In other words, centers of apertures in each of the pairs of apertures 206 are aligned in the first direction 220. Each of the pairs of apertures 206 is also aligned with another one of the pairs of apertures 206 in the first direction 220. As such, the second plurality of apertures 202 includes at least four apertures aligned with one another in the first direction 220. Additionally, each aperture in the second plurality of apertures 202 is also aligned with an aperture of another pair in a second direction 230 substantially perpendicular to the first direction. As such, the second plurality of apertures 202 includes four sets of apertures aligned in the second direction 230. The second plurality of apertures 202 are each contained on an outline of a rectangle having smaller dimensions than the mounting plate 102.

The first plurality of apertures 200 includes a plurality of rows of apertures 204. Each row of apertures 204 includes two groupings of evenly-spaced apertures with a substantially planar gap 208 disposed between the groupings. The gap 208 facilitates the structural strength of the mounting plate 102 and saves resources by limiting the number of apertures contained in the mounting plate 102. As shown, the first plurality of apertures 200 includes five rows of apertures 204, with each row of apertures 204 including two groupings of four evenly-spaced apertures. Each row of apertures 204 is aligned with the other rows of apertures 204 in the second direction 230. Such an arrangement simplifies the manufacturing of the mounting plate 102, as the same procedure may be used to form each of the rows of apertures 204. However, it should be understood that any of the rows of apertures 204 may include differing numbers of apertures or be offset from one another in any direction in accordance with the present disclosure.

As shown in FIG. 2A, the second plurality of apertures 202 includes two pairs of apertures 206 disposed proximate to a first (e.g., upper) edge of the mounting plate 102. The second plurality of apertures 202 also includes an additional two pairs of apertures 206 disposed between two of the rows of apertures 204 of the first plurality of apertures 200. In the example shown, the additional two pairs of apertures 206 are disposed between a bottommost row of apertures 204 (e.g. disposed proximate to a second edge of the mounting plate 102 opposite to the first edge) and a next-to-bottommost row of apertures 204.

Figure 2B:
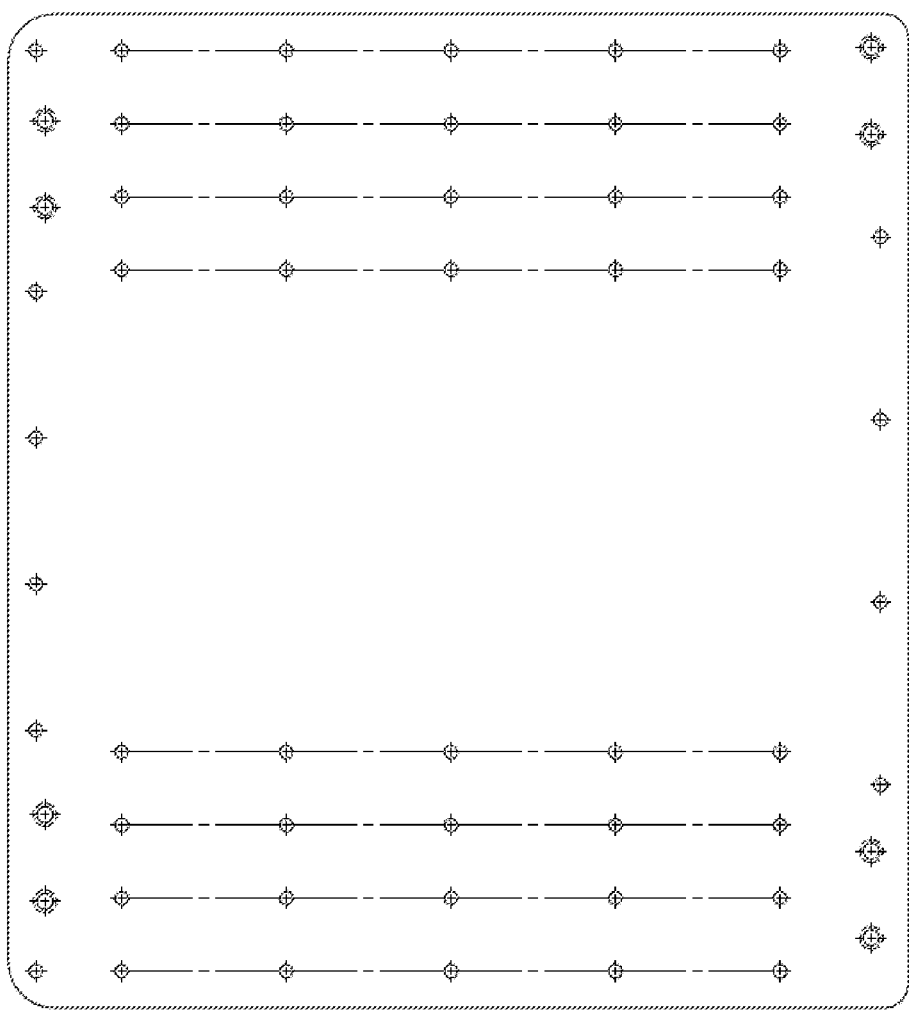
FIG. 2B is a schematic diagram showing dimensions of the mounting plate shown in FIG. 2A, according to an example embodiment.

FIG. 2B shows an example set of dimensions and distances between various features of the mounting plate 102 described with respect to FIGS. 1A, 1B, 1C, and 2A. It should be understood that the dimensions contained in FIG. 2B are not limiting, as alternative sets of dimensions may be used in various alternative embodiments. As shown, the mounting plate has a first dimension (e.g., height) in the second direction 230 of approximately 22 inches (e.g., within a 0.03 inch tolerance) and a second dimension (e.g., width) in the first direction 220 of approximately 26 inches (e.g., within a 0.03 inch tolerance). In this embodiment, the mounting plate 102 has a smaller area than the mounting panel 104 described with respect to FIGS. 1A, 1B, and 1C. As described herein, such smaller dimensions enable the relative positioning between the mounting plate 102 and the mounting panel 104 to be changed while still maintaining alignment between apertures contained therein to provide mounting flexibility.

As shown, each of the pairs of apertures 206 includes two apertures separated by a first distance. In the example shown, the first distance is approximately 2.375 inches (e.g., within a tolerance of 0.01 inches). In various embodiments, the spacing between the apertures in the pairs of apertures 206 is selected based on the structure of the mounts 106. For example, the spacing between the apertures in the pairs of apertures 206 may be selected to substantially correspond to a distance between apertures of the mounts 106 (e.g., between first apertures contained in extending portions on mounts 106) to enable fasteners 110 to be inserted therethrough.

Distances between apertures in different ones of the pairs of apertures 206 may be selected based on the arrangement of mounting apertures contained in the mounting panel 104. For example, an outer aperture in a first pair of apertures 206 may be separated by a second distance from an inner aperture of second pair of apertures 206 aligned with the first pair in the first direction 220. In the example shown, the second distance is approximately 19 inches (e.g., within a 0.01 inch tolerance). In various embodiments, the second distance is selected based on the distance between mounting apertures contained in the mounting panel 104. In such a configuration, when mounts 106 are attached to mounting plate 102 (e.g., as shown in FIG. 1A) via the second plurality of apertures 202) second openings in the mounts are aligned with the mounting apertures. As such, the configuration of the second plurality of apertures 202 facilitates effortless alignment of the mounts 106, eliminating the need for an installer to align the mounts 106.

Additionally, the pairs of apertures 206 may be separated from one another by a third distance in the second direction 230 based on a distance between mounting apertures (e.g., disposed on opposite sides of the opening 116) to facilitate alignment of the mounts 106 with the mounting apertures. In the example shown, the third distance is approximately 16.85 inches (e.g., within a 0.01 inch tolerance). In various embodiments, diameters of the second plurality of apertures 202 are selected based on a desired dimension (e.g., thickness, threading, etc.) of fasteners 110 used to attach the mounting plate 102 to the exterior surface of the vehicle.

As shown, the bottom set of pairs of apertures 206 is disposed further from the bottom edge of the mounting plate 102 than an upper set of pairs of apertures 206 is to the upper edge of the mounting plate 102. As shown, the bottom set of pairs of apertures 206 is approximately 4 inches (e.g., within a 0.01 tolerance) from the bottom edge. Such a greater distance facilitates the opening 116 of mounting panel 104 overlapping with a greater portion of the second plurality of apertures 200 to provide a plurality of potential locations to attach mounting plate 102 to the vehicle.

With continued reference to FIG. 2B, each of the rows of apertures 204 is separated by an equal distance of approximately 4.5 inches (e.g. within a 0.03 inch tolerance) in the second direction 230. Additionally, each grouping of apertures in each of the rows of apertures 204 is separated by another equal distance of approximately 2 inches (e.g., within a 0.03 inch tolerance) in the first direction 220. The equally spaced arrangement of the first plurality of apertures 200 provides an installer with a plurality of symmetrical combinations of connection points to securely mount the mounting plate 102 to an external surface of the vehicle.

Referring now to FIG. 3, a flow diagram of a method 300 of installing a condenser unit of an auxiliary air conditioning system to an exterior surface of a vehicle is shown, according to an example embodiment. Method 300 may be executed by an installer of the auxiliary air conditioning system to mount a condenser unit including a condenser coil and a compressor to a rear surface of a cab of an over-the-road vehicle.

In an operation 302, a mounting plate comprising a plurality of apertures is provided. For example, in one embodiment, the mounting plate 102 described with respect to FIGS. 2A and 2B may be provided. As such, a mounting plate including first and second pluralities of apertures may be provided. The second plurality of apertures may include a plurality of sets (e.g., pairs) of apertures. Each set of apertures may include apertures arranged based on the structure of isolation mounts used to attach the condenser unit to the mounting plate. Thus, each set of apertures may include any number of apertures depending on the structure of the isolation mounts.

Additionally, the sets of apertures in the second plurality of apertures may be arranged with respect to one another such that, when the isolation mounts are attached to the mounting plate via the sets of apertures, additional portions of the isolation mounts are positioned in a relationship that corresponds to an arrangement of mounting apertures contained in a portion (e.g., a mounting panel) of the condenser unit.

The first plurality of apertures may include any arrangement of apertures that may be used to attach the mounting plate to a frame of the vehicle (e.g., at the external surface). For example, in some embodiments, the first plurality of apertures includes a plurality of equally spaced apertures (e.g., in a cubic arrangement). In alternative embodiments, the first plurality of apertures may include a plurality of groupings of evenly-spaced apertures.

In an operation 304, a plurality of mounts is attached to the mounting plate through the insertion of fasteners into first ones of the plurality of apertures in the mounting plate. For example, fasteners may be inserted through the second plurality of apertures in the mounting plate and through corresponding portions of mounts. Additional fasteners (e.g., nuts and spacers) may be used to attach the mounting plate to the mounts. Any number of mounts may be used depending on the implementation. For example, in one embodiment, the plurality of mounts includes four mounts that, once attached to the mounting plate, are disposed at four corners of a rectangle. Since the second plurality of apertures are arranged in a manner based on the spacing of mounting apertures contained in a portion of the condenser unit, the mounts are arranged to align with the mounting apertures. As such, the installer needn't align the mounts with respect to one another.

In an operation 306, the portion of the condenser unit is attached to the plurality of mounts. For example, fasteners (e.g., screws) may be inserted through mounting apertures in the portion and into the mounts attached to the mounting plate. In various embodiments, the portion of the condenser unit includes a mounting panel to which various additional components of the condenser unit may be attached. The rear panel may include an opening that exposes the first plurality of apertures in the mounting plate. Thus, the first plurality of apertures may be used to attach the combination of the mounting plate and the portion of the condenser unit to any suitable location of an external surface of the vehicle. For example, the installer may attach the combination to a frame of a cab of the vehicle by drilling various holes in the frame. Fasteners may then be inserted through the first plurality of apertures via the opening.

In an operation 308, once the combination of the mounting plate and portion of the condenser are attached to the exterior surface of the vehicle, the remainder of the condenser unit is attached to the portion. For example, a housing or a frame of the condenser unit may be attached at various points (e.g., tabs extending from the opening, an extending portion extending from the portion attached to the exterior surface of the vehicle, etc.) of the portion to secure the condenser unit to the exterior of the vehicle. As such, the apparatus and methods described herein eliminate the need for an installer to lift the heavy condenser unit to find a suitable mounting location. Additionally, the mounting plate, by including pre-arranged apertures, eliminates the need to manually align the mounts with respect to one another. Thus, using the mounting structure disclosed herein, installers may efficiently and reliably attach the condenser unit to an exterior surface of the vehicle.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A vehicle comprising:
   a cab including a surface;
   a mounting plate disposed on the surface, the mounting plate including a plurality of apertures, the mounting plate attached to the surface via fasteners extending through the plurality of apertures;
   an auxiliary air conditioning system comprising:
      an evaporator disposed interior to the cab; and
      a condenser unit, the condenser unit comprising a mounting panel attached to the surface via the mounting plate; and
   a plurality of mounts disposed between the mounting plate and the mounting panel, the plurality of mounts being attached to the mounting plate via first openings in the mounts and attached to the mounting panel via second openings in the mounts.

2. The vehicle of claim 1, wherein each mount of the plurality of mounts is disposed proximate to a corner of a rectangle outlined by the plurality of apertures.

3. The vehicle of claim 1, wherein the mounting panel includes a main portion affixed to the plurality of mounts and an attachment portion extending perpendicularly from the main portion.

4. The vehicle of claim 1, wherein the mounting panel includes a main portion affixed to the plurality of mounts, and wherein the main portion comprises an opening that overlaps with at least some apertures of the plurality of apertures.

5. The vehicle of claim 4, wherein the opening includes a first region and a second region extending from a boundary of the first region, and wherein the mounting panel includes tabs that extend from a boundary of the second region.

6. The vehicle of claim 1, wherein the plurality of apertures includes a plurality of pairs of apertures, each pair including a first aperture aligned with a second aperture in a first direction.

7. The vehicle of claim 1, wherein the plurality of apertures comprises a plurality of rows of apertures.

8. The vehicle of claim 7, wherein each row of apertures includes a first grouping of apertures proximate to a first edge of the mounting plate and a second grouping of apertures proximate to a second edge of the mounting plate.

9. The vehicle of claim 1, wherein the plurality of apertures is a first plurality of apertures, wherein the mounting plate further comprises a second plurality of apertures, and wherein the mounting panel is attached to the mounting plate via the second plurality of apertures.

10. The vehicle of claim 1, wherein the surface is a rear surface of the cab.

11. A vehicle, comprising:
    a cab including a surface;
    a mounting plate disposed on the surface, the mounting plate including a plurality of apertures, the mounting plate attached to the surface via fasteners extending through the plurality of apertures, the plurality of apertures includes a plurality of pairs of apertures, each pair including a first aperture aligned with a second aperture in a first direction, each pair of apertures aligned with another pair of apertures in the first direction such that the plurality of apertures includes at least four apertures aligned in the first direction, the at least four apertures including inner apertures separated by a first distance in the first direction; and an auxiliary air conditioning system comprising:
an evaporator disposed interior to the cab; and
a condenser unit, the condenser unit comprising a mounting panel attached to the surface via the mounting plate.

12. A method of installing a condenser unit onto a surface of a cab of a vehicle comprising:
providing a mounting plate comprising a first plurality of apertures and a second plurality of apertures;
attaching a plurality of mounts to the mounting plate via inserting fasteners through first openings in the mounts and through the first plurality of apertures;
attaching a portion of the condenser unit to the plurality of mounts via inserting fasteners into second openings in the mounts and through mounting apertures of the portion; and
attaching the mounting plate to the surface of the vehicle by inserting fasteners through the second plurality of apertures and into openings in the surface.

13. The method of claim 12, wherein attaching the portion of the condenser unit further comprises:
providing a mounting panel, the mounting panel including a main portion that defines an opening; and
aligning the mounting panel with the mounting plate so that the opening overlaps at least some of the first plurality of apertures.

14. The method of claim 13, wherein attaching the mounting plate to the surface of the vehicle comprises inserting fasteners through a portion of the first plurality of apertures that is exposed through the opening.

15. The method of claim 12, wherein attaching the portion of the condenser unit further comprises:
providing a mounting panel, the mounting panel including a main portion that defines the mounting apertures; and
aligning the mounting panel with the mounting plate so that the mounting apertures overlap with the plurality of mounts.

16. The method of claim 12, wherein attaching at least one of the plurality of mounts to the mounting plate comprises inserting a pair of fasteners through a respective pair of the first plurality of apertures.

17. The method of claim 12, further comprising attaching a remainder of the condenser unit to the portion.

\* \* \* \* \*